June 23, 1964  H. F. KLEINHANS  3,138,432
DEVICE FOR TREATMENT OF AMBIENT ROOM ATMOSPHERE
Filed May 11, 1962
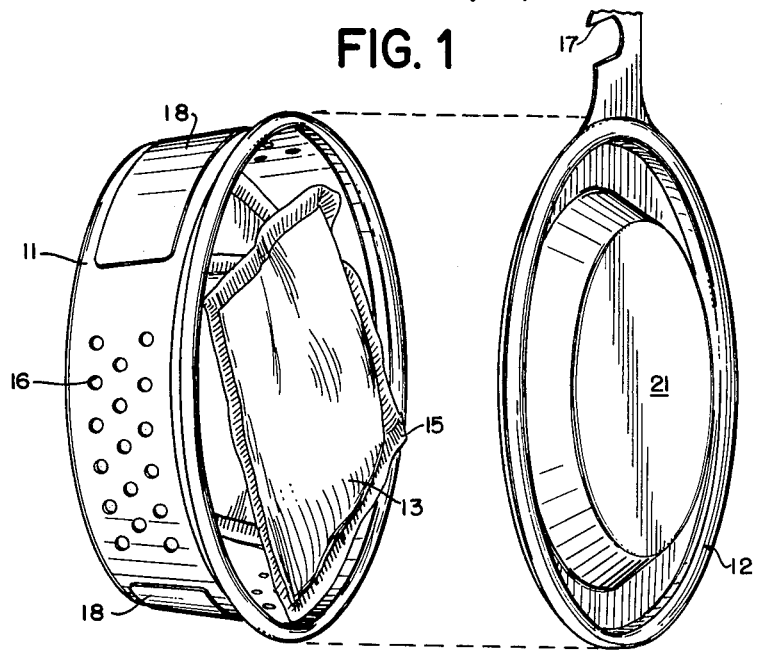
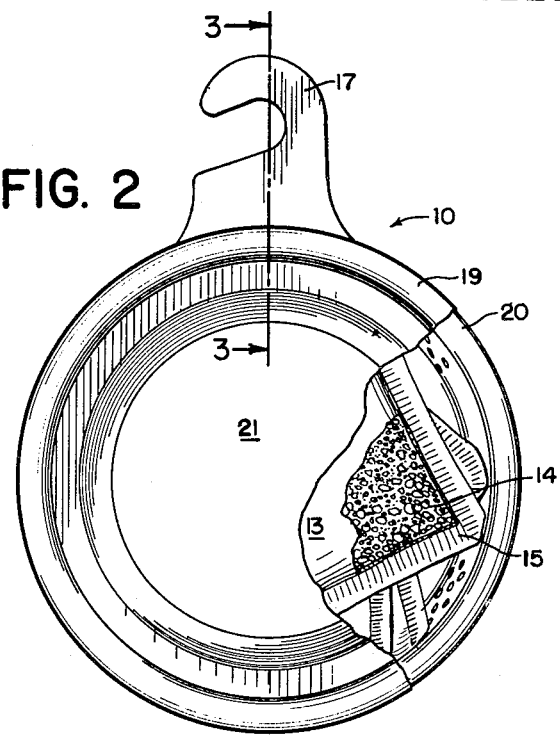
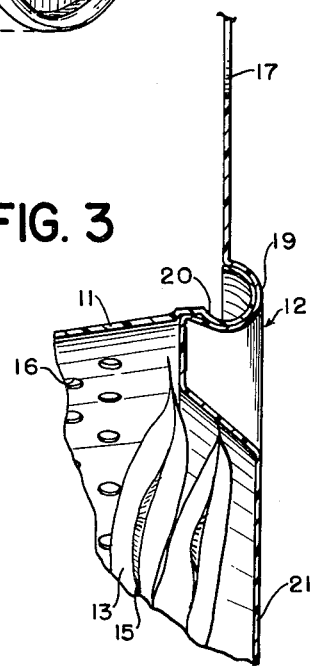
INVENTOR.
HERBERT F. KLEINHANS
BY
Mandeville and Schweitzer
ATTORNEYS United States Patent Office 3,138,432
Patented June 23, 1964

3,138,432
DEVICE FOR THE TREATMENT OF AMBIENT ROOM ATMOSPHERE
Herbert F. Kleinhans, Bedford Hills, N.Y., assignor to Luce Reflexite Corporation, South Norwalk, Conn., a corporation of Delaware
Filed May 11, 1962, Ser. No. 193,944
1 Claim. (Cl. 21—122)

The present invention relates to devices for treating the ambient atmosphere in closets, rooms, and the like, and more specifically to a device which employs a chemical treating agent having pulverulent or powdering characteristics.

Of the many different chemical compounds known to the art for use in deodorizing applications, activated charcoal has proved to be consistently among the most efficient and most reliable. However, its high absorption characteristics have been offset somewhat for certain specific applications in the home, for example, by its tendency to form charcoal dust and powder, which, of course, is quite deleterious to garments, upholstery, and the like with which it may very likely come into contact.

The air treating device of the present invention enables activated charcoal particles to be employed in ordinary household applications, in closets for example, by providing means for exposing the activated charcoal, including the charcoal dust inherent in the use of charcoal, to the ambient atmosphere in a safe manner which prohibits the charcoal and the accompanying powdery dust particles from entering the atmosphere to soil and contaminate clothing, fabrics, and the like.

The new and improved combination of the present invention includes a perforated enclosure or casing adapted to be suspended in the atmosphere to be deodorized and housing a charge of activated charcoal; however, to prevent the dust or powdery particles formed by the charcoal from escaping through the apertures in the casing and causing damage to household effects, the charcoal charge is sheathed entirely within an envelope of porous fibrous material. The envelope material advantageously is very much like that used in the fabrication of tea bags, and, as a matter of fact, tea bag papers, themselves, have been found quite acceptable for the objectives of this invention, namely, the exposure of an effective chemical treating agent to a room atmosphere without contaminating any object in the room by dust or powder emanating from the chemical agent.

From the above description it will be apparent to those skilled in the art that the present invention may readily be adapted, by use of other available, appropriate chemical treating agents, for insecticidal, de-humidifying, moisturizing, or other similar room air treating applications. Thus the disclosure hereinafter will be made in terms of a specific room air deodorizing device, by way of illustration only and not by way of limitation.

To understand more completely the nature of the present invention, reference should be made to the following description taken in conjunction with the accompanying drawing in which:

FIG. 1 is a perspective view of an air treating device, embodying the principles of the invention;

FIG. 2 is a front elevational view of the device of FIG. 1 with a section of the cover broken away to show interior portions of the casing; and FIG. 3 is an enlarged cross sectional view, taken along line 3—3 of FIG. 2, showing details of construction of the casing body and cover.

A two-piece casing indicated generally by the reference numeral 10 in FIG. 2 and including a cylindrical body 11 with end cover wall 12 (shown clearly in FIG. 1) is provided to house a plurality of envelopes 13 of activated charcoal 14. The envelopes 13 are advantageously fabricated from fibrous porous sheet material and are very much in the nature of tea bags, with the exception that the charge in the envelope is activated charcoal rather than tea leaves. The fibrous porous material advantageously is of the heat sealable type, so that the envelopes can be formed by sealing the edges 15 with conventional heat sealing machinery such as is now in prevalent use in the packaging industry. The envelope is of sufficient porosity to allow room air to circulate freely within the envelope, yet the pores or apertures of the envelope are small enough to prohibit any charcoal dust or sub-miniature particles from escaping from the device to damage household goods and the like which may be in the environment being treated.

As may be seen in FIG. 2, a preferred embodiment of the present invention includes four individual charcoal-charged envelopes 14. Use of a number of small envelopes rather than a single large envelope has increased the efficiency of the device by permitting more air to circulate through and about the active, chemical air-treating medium.

The body 11 of the casing 10 advantageously is provided with a series of orifices 16 which allow room air to flow into the casing to be acted upon by the activated charcoal contents 14 of the envelopes 13. In accordance with the invention, the size of the orifices 16 is such, in relation to the size and nature of the treating material, as would accommodate passage of at least some of the treating material were it not otherwise contained within the casing by the porous tissue. The orifices 16 may be disposed in a variety of patterns about the casing body, and, if desired or necessary, additional orifices may be included in the casing cover 12.

As seen in FIG. 2 the cover is provided with suitable suspension means such as an integral hook 17, enabling the casing to be positioned with its orifices 16 exposed to the circulating air.

The "shelf" life of the envelopes 13 may be preserved by initially sealing all of the casing perforations 16 with readily removable adhesive tapes 18 to isolate the charcoal-charged envelopes from the ambient atmosphere and to maintain them in a relatively inactive state until their active deodorizing use is required. At that time, removal of the tapes 18 will place the device into an active, room-deodorizing condition.

The casing 10 is advantageously manufactured from a flexible plastic and its dimensions determined by the number and size of envelopes to be housed therein. The cover 11 is of circular configuration and advantageously has concave, circumferential rim portions 19 which are adapted to be snapped onto mating convex, circumferential rim portions 20 of the casing body 11. The cover 12 is also advantageously provided with a hollow bubble portion 21 to increase the overall housing capacity of the casing 10.

The principles of the present invention enable known effective chemical treating agents with tendencies to form a dust or to crumble into fine powder, such as activated charcoal, to be adapted for ordinary household use without subjecting household articles to soiling or the like.

Although the present invention has been described with reference to a specific, preferred embodiment, it should be understood that the disclosure has been made only by way of example and that certain changes in details of construction and arrangement of the elements may be made without departing from the spirit and scope of the invention as hereinafter claimed.

In combination, a device for the deodorizing treatment of ambient room atmosphere, comprising (a) a single chamber having a predetermined volume for housing a treating medium,
(b) said chamber having closed end walls,
(c) at least one of said end walls being adapted to provide a means of initial access to the interior portions of said chamber,
(d) said chamber defining a plurality of orifices disposed in a predetermined geometrical relationship to outline a predetermined pattern,
(e) air treating chemical means including activated, granular charcoal particles for absorbing odors in the ambient room atmosphere,
(f) at least some of said charcoal particles having a diameter less than the diameter of said orifices, and
(g) a plurality of envelopes, each of which completely encloses a predetermined charge of said chemical means, having a volumetric displacement substantially less than said predetermined volume,
(h) said envelopes being made of porous tea bag paper,
(i) each of said charged envelopes forming a portion of said treating medium,
(j) each of said charged envelopes being of limited predetermined size smaller than said means of initial access whereby it may be readily inserted into the interior portions of said chamber along with other charged envelopes,
(k) said charged envelopes being arrayed within said chamber to define air gaps therebetween and thereby accommodating substantial circulation of air therethrough, therebetween, and thereover.

References Cited in the file of this patent

UNITED STATES PATENTS

| | | |
|---|---|---|
| 2,085,991 | Minor | July 6, 1937 |
| 2,222,882 | Shames | Nov. 26, 1940 |
| 2,251,058 | Kirkman | July 29, 1941 |
| 2,557,432 | Holstedt | June 19, 1951 |

FOREIGN PATENTS

| | | |
|---|---|---|
| 333,698 | Great Britain | Aug. 21, 1930 |
| 14,360/33 | Australia | Sept. 17, 1934 |
| 14,360 | Australia | Sept. 16, 1933 |